Dec. 1, 1970　　　　　L. W. DAVIDSON　　　　　3,543,461
HANGAR FOR SWEPT-WING AIRCRAFT
Filed Feb. 29, 1969　　　　　　　　　　　2 Sheets-Sheet 1
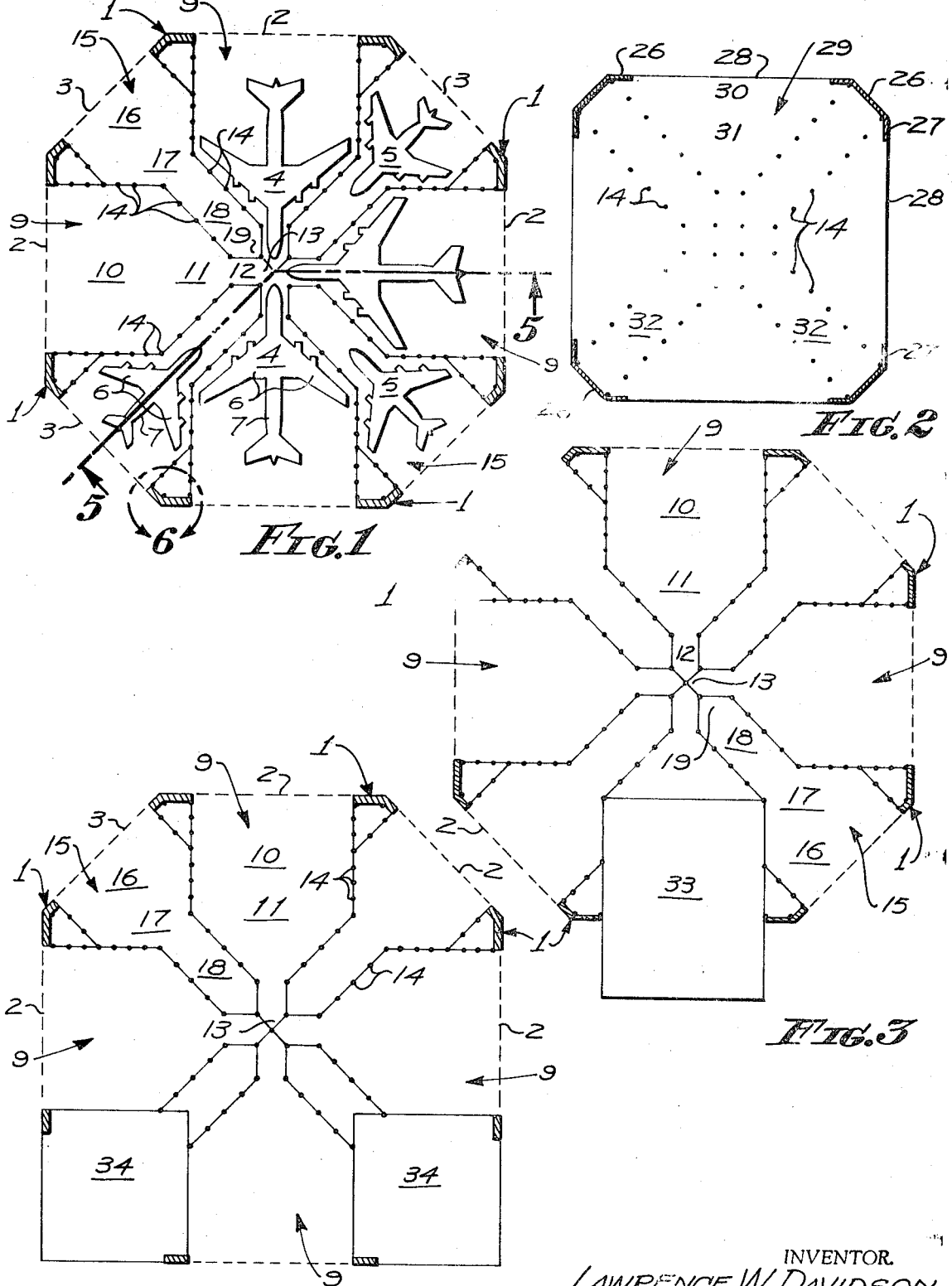
INVENTOR.
LAWRENCE W. DAVIDSON
BY
ATTORNEYS Dec. 1, 1970  L. W. DAVIDSON  3,543,461
HANGAR FOR SWEPT-WING AIRCRAFT
Filed Feb. 29, 1969  2 Sheets-Sheet 2
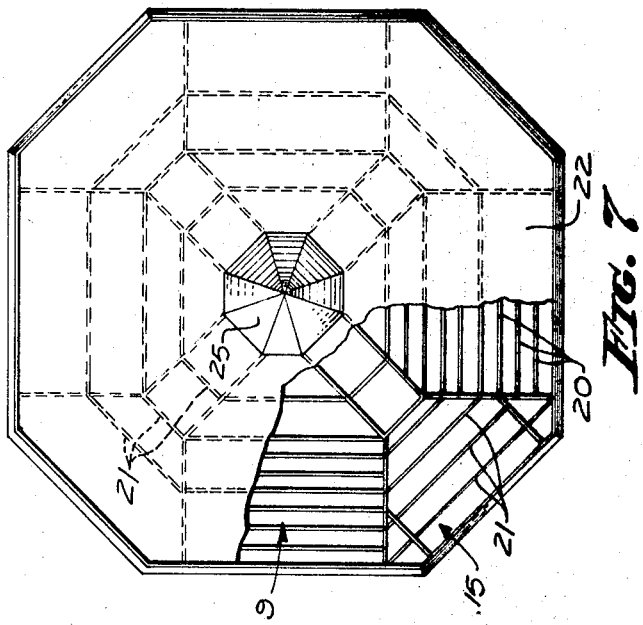
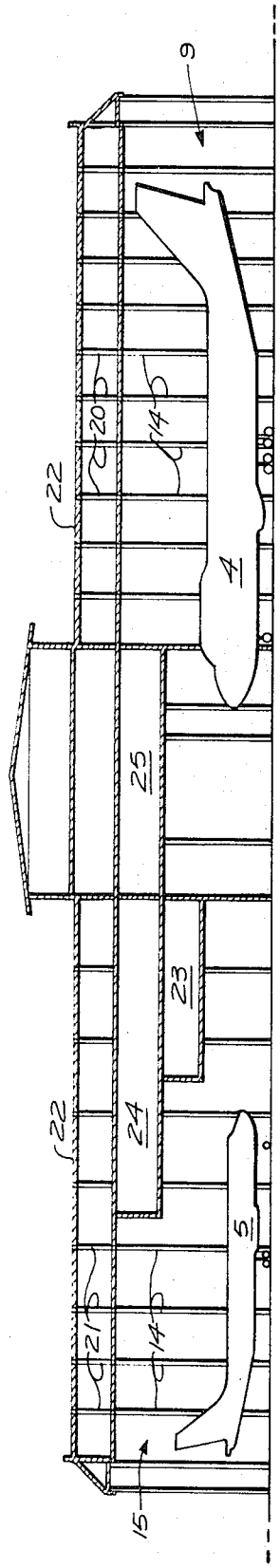
INVENTOR.
LAWRENCE W. DAVIDSON
BY
*Lyon Lyon*
ATTORNEYS United States Patent Office 3,543,461
Patented Dec. 1, 1970

3,543,461
HANGAR FOR SWEPT-WING AIRCRAFT
Lawrence W. Davidson, North Hollywood, Calif.
(3518 Cahuenga Blvd. W., Los Angeles, Calif. 90028)
Filed Jan. 29, 1969, Ser. No. 794,940
Int. Cl. E04h 6/44
U.S. Cl. 52—237        8 Claims

ABSTRACT OF THE DISCLOSURE

An aircraft hangar having right angularly related aircraft stalls terminating in V-shaped inner ends in approximate parallelism with the leading edges of swept-wing aircraft and defining accommodation openings for the forward ends of the aircraft fuselages, the hangar providing work space between the leading edges of the wings of right-angularly related aircraft.

BACKGROUND OF THE INVENTION

With the development of aircraft of ever increasing size and the concurrent development of the delta or swept-back wing aircraft configuration, conventional hangars of rectangular shape occupy excessive land area and do not permit efficient use or location of repair and maintenance equipment. Furthermore, particularly if the hangar is intended to house more than a single aircraft, the spacing between pillars becomes excessive requiring beams or girders of excessive height so that the hangar cannot be designed for efficient use of the repair and maintenance equipment without exceeding the height limits necessarily imposed at airfields, and even if permitted, pose severe problems of resistance to earthquake and high winds.

OBJECTS OF THE INVENTION

The objects of this invention include:

First, to provide an aircraft hangar which accommodates delta or swept-wing aircraft in right angular, nose-in relation so that equipment employed to repair or maintain the aircraft is arranged in an essentially central location requiring minimum movement of the equipment and minimum movement of aircraft components involved in repair or maintenance.

Second, to provide an aircraft hangar, which, though capable of accommodating four or eight aircraft at one time, requires a minimum span between pillars so that the height of the hangar may be minimized; and further, the configuration of the hangar is such that the hangar has improved resistance to earthquake and high winds, these advantages being accomplished at a minimum cost.

Third, to provide an aircraft hangar which, while intended primarily for aircraft repair and maintenance, is also applicable as a passenger loading and unloading terminal.

Fourth, to provide an aircraft hangar which may be modified to meet various conditions of use; that is portions of the hangar may be modified to provide warehouse, office or passenger handling facilities so that the hangar may be used at remote small airports where traffic is light or at large airports where traffic is at a maximum.

DESCRIPTION OF THE FIGURES

FIG. 1 is an essentially diagrammatical plan view of the hangar for swept-wing aircraft, showing the aircraft in outline.

FIG. 2 is a similar plan view, showing a modified form of the hangar.

FIG. 3 is another plan view, showing a further modified form in which an office or storage area is substituted for one of the major aircraft bays.

FIG. 4 is a similar plan view, showing arrangement in which office or storage areas are substituted for other aircraft bays.

FIG. 5 is an enlarged essentially diagrammatical sectional view, taken through 5—5 of FIG. 1.

FIG. 6 is an enlarged plan view, taken within circle 6 of FIG. 1.

FIG. 7 is an essentially diagrammatical top view of the construction shown in FIG. 1 with a portion of the roof broken away to show the ceiling beams and indicating additional beams by dotted lines.

SPECIFICATION

Reference is directed particularly to FIGS. 1, 5 and 6. The aircraft hangar structure here illustrated is octagonal in plan, the corners being defined by corner structures 1. Four right-angularly related sides of the hangar are occupied with major door openings 2, the sides terminating at the corresponding corner structures 1. The remaining four sides are occupied principally by minor door openings 3, the side margins of which are also defined by the corner structures 1.

The major door openings 2 are intended to receive larger aircraft 4; for example, the type presently identified as the 747. The minor door openings 3 are intended to receive smaller aircraft 5; for example, the type designated 707. Both types of aircraft are provided with swept or delta wings 6, which extend from the fuselage 7, the leading edges of the wings being disposed in approximate right-angular relation; actually the angle between these leading edges is slightly greater than 90°.

The door openings 2 and 3 are adapted to be closed by multiple sliding doors 8, which store in the corner structures 1.

The major door openings form the outer ends of major bays 9. Each bay 9 includes a rectangular outer portion 10, a trapezoidal intermediate portion 11 and a relatively narrow inner portion 12 which may have an apex end 13 terminating at the center of the hangar structure.

It is intended that the inner portion 12 of each major bay receive the nose portion of an aircraft and that the diverging sides of the trapezoidal intermediate portions 11 confront the leading edges of the wings 6 of the aircraft. The outer portions 10 have sufficient lateral span to clear the wing tips. Thus, as indicated, the aircraft is received nose inward and is intended to be drawn into position by a towing vehicle and also is intended to be drawn out of the bay by a towing vehicle. Alternatively, a buried chain or cable operating through a slot in the floor and using a tension lead may be utilized. Such structure is not illustrated as it is not included in the present invention.

The boundaries of the major bays 9 are formed by column members 14. Most of the column members 14 also serve to define the boundaries of minor bays 15, located between the major bays and accessible through the minor door openings 3.

Similar to the major bays 9, the minor bays 15 include rectangular outer portions 16, which in comparison to the rectangular outer portions 10, are relatively shallow. The outer portions 16 join trapezoidal intermediate portions 17, the sides of which are common to the sides of the rectangular outer portions 10. The intermediate portions 17 join to elongated inner portions 18, formed between the sides of the intermediate portions 11, and may form apex ends 19.

The column members 14, at opposite sides of the major bays 9, are joined by supporting beams 20, and similarly, the column members are joined by supporting beams 21, which span the minor bays. The supporting beams carry a roof structure 22.

It will be noted that the struts of column members 14 extend from the periphery of the hangar structure to the central region thereof, and that the supporting beams 20 and 21 are in practical effect continuous. Or stated otherwise, they define a series of concentric, octagonal beam systems, each supported by column members. The result is that the hangar structure is extremely resistant to all of the forces which may be encountered, such as high wind loads and extreme earthquake loads. While omitted to simplify the illustration, the beams are provided with conventional diagonal bracing and similar bracing is provided between concentric beams. Also, such bracing is provided between the column members.

It should be noted that each inner portion 18 forms a work area that is common to the leading edges of confronting wings of right-angularly related major aircraft 4, and to the adjacent sides of the nose portions, and in addition to the wings and nose portions of a smaller aircraft 5 therebetween.

The supporting beams 20 and 21 are preferably located at a common level sufficient to clear the tail assemblies of the larger aircraft. As a consequence, the space above each inner portion 18 of the minor bays 15 and the work area associated therewith, may be utilized to form elevated enclosures 23 for office or other use, and may occupy several levels and may, as indicated by 24, extend over the nose portions of the smaller aircraft 5. Actually, such enclosures may be suspended from the beams 20 and 21 and extend over all or selected major bays 9 and minor bays 15, terminating short of the tail assemblies. Such extensive multiple story enclosures exceeds the normal requirements. It will be noted that the beams 20 and 21 spanning the major bays 9 and minor bays 15 may be utilized to support carriage structures, not shown, which may be moved along the fuselages and along the wings to facilitate servicing of the aircraft.

While the hangar structure is intended primarily for the service and maintenance of aircraft, as distinguished from passenger loading and unloading, it should be noted that the elevated space available for enclosed floors or levels may be utilized for the handling of passengers. In this regard, an elevated central multiple level rotunda 25 may be provided and may, if desired, project above the normal roof level.

It should be noted that the hangar construction lends itself to a low silhouette which is highly desirable.

Reference is now made to FIG. 2. The construction here shown is intended primarily for use as a service hangar and includes corner structures 26, having right-angularly related marginal walls 27, that define right-angularly related door openings 28, forming the outer ends of aircraft bays. The bays may have a lesser depth than the aircraft intended to be accommodated, but are shaped in plan similar to the bays 9 and 15 of the first described structure; that is, each bay forms a rectangular outer portion 30, which is illustrated as relatively shallow joined to a trapezoidal portion 31. The bays are defined by column members 14 as in the first described structure. However, the bays are preferably spaced to form rectangular regions 32, corresponding to the regions 18 of the first described structure, which may be employed as work areas common to adjacent right-angularly related aircraft. By exposing the tail assemblies of the aircraft, the height of the hangar may be reduced, otherwise the roof structure and its supporting beams carried by the column members is essentially the same as shown in the first described structure.

Reference is directed to FIG. 3. The first described structure is capable of handling four major or larger aircraft 4 and four smaller aircraft 5. If service requirements permit, the hangar structure may be modified to eliminate one or more of the major bays 9 so that a larger percentage of smaller aircraft is accommodated. The omitted bay may constitute an office or warehouse area 33.

It should be noted that while the major bays 9 are intended primarily to receive larger aircraft 4, that two or even three smaller aircraft 5 may be accommodated, assuming that these be of the 707 type. Of course, if still smaller aircraft need to be serviced an even larger number may be accommodated.

Reference is now directed to FIG. 4. If the conditions of use permit, the hangar structure may be adapted for the servicing principally of larger aircraft 4, in which case one or more of the minor bays 15 may be omitted and office or warehouse areas 34 substituted.

Other arrangements may be provided while still retaining the essential construction shown in FIG. 1.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A hangar for swept-swing aircraft, comprising:
 (a) sets of spaced columns defining a plurality of aircraft receiving bays, each bay including a relatively narrow inner portion defined by substantially parallel spaced rows of columns and dimensioned to receive the nose portion of an aircraft, an intermediate portion having diverging sides defined by rows of said columns extending from said spaced rows, and a relatively wide outer portion; said outer portion having sides defined by further parallel rows of said columns and terminating in an entrance opening to receive said aircraft;
 (b) beams bridging each bay between said columns;
 (c) a roof supported by said beams;
 (d) said bays radiating from a common center with said inner portions adjacent said center.
2. A hangar, as defined in claim 1, wherein:
 (a) the columns defining the sides of each bay also define the sides of adjacent bays, the spaces between columns being unobstructed and open for free passage between said columns.
3. A hangar, as defined in claim 1, wherein:
 (a) the rows of columns defining the diverging sides of certain bays are generally parallel and spaced apart to define a common work area available to any aircraft engines at the leading edges of confronting aircraft wings in said certain bays.
4. A hangar, as defined in claim 1, wherein:
 (a) adjacent bays are arranged at forty-five degrees to each other and the rows of columns defining a side of the outer portion of one bay also define the diverging sides of the bays on opposite sides thereof;
 (b) and the rows of columns defining the sides of the inner portions of said adjacent bays define the diverging sides of said one bay.
5. A hangar for swept-wing aircraft, comprising:
 (a) sets of spaced columns defining a plurality of aircraft receiving bays, each bay including a relatively narrow inner portion defined by substantially parallel spaced rows of columns and dimensioned to receive the nose portion of an aircraft, an intermediate portion having diverging sides defined by rows of said columns extending from said spaced rows, and a relatively wide outer portion; said outer portion having sides defined by further parallel rows of said columns and terminating in an entrance opening to receive said aircraft;
 (b) beams bridging each bay between said columns;
 (c) a roof supported by said beams;
 (d) said bays radiating from a common center with said inner portions adjacent said center;
 (e) said hangar comprising a building structure of octagon shape in plan, at least some of each of certain sides of said building structure having an entrance opening therein.

6. A hangar, as defined in claim 5, wherein:
(a) the diverging sides of the intermediate portions of said bays are spaced apart to form motor servicing areas common to adjacent bays.

7. A hangar, as defined in claim 5, wherein:
(a) the other sides of said building structure also have aircraft entrance openings spanning the width of aircraft intended to be received therein;
(b) said sets of columns also defining a second group of right-angularly related aircraft bays disposed between and having sides common with the group of aircraft bays having entrance openings in said certain sides;
(c) each of said second group of bays also defining a relatively narrow inner portion having generally parallel sides, an intermediate portion having diverging sides, and an outer portion having generally parallel sides extending to the entrance opening in a corresponding side of said building structure.

8. A hangar, as defined in claim 7, wherein:
(a) the inner portions of the second group of bays are disposed between the diverging sides of the intermediate portions of the first group of bays, and the diverging sides of the intermediate portions of the second groups of bays are common with sides of the outer portions of the first group of bays.

References Cited

UNITED STATES PATENTS

| | | | |
|---|---|---|---|
| 1,780,102 | 10/1930 | Watt | 52—234 |
| 2,420,186 | 5/1947 | Miller | 52—237 |
| 2,574,307 | 11/1951 | Whelan | 52—234 |

FOREIGN PATENTS

| | | |
|---|---|---|
| 730,879 | 1932 | France. |
| 814,637 | 1937 | France. |
| 855,612 | 1940 | France. |
| 525,429 | 1955 | Italy. |

JOHN E. MURTAGH, Primary Examiner